United States Patent
Fujisaki et al.

(10) Patent No.: US 12,517,023 B2
(45) Date of Patent: Jan. 6, 2026

(54) THREE-DIMENSIONAL HARDNESS DISTRIBUTION MEASUREMENT METHOD AND THREE-DIMENSIONAL HARDNESS DISTRIBUTION MEASUREMENT SYSTEM

(71) Applicant: RIKEN, Saitama (JP)

(72) Inventors: Kazuhiro Fujisaki, Saitama (JP); Norio Yamashita, Saitama (JP); Hideo Yokota, Saitama (JP); Naomichi Furushiro, Osaka (JP); Daisuke Hirooka, Osaka (JP)

(73) Assignee: RIKEN, Saitama (JP)

( * ) Notice: Subject to any disclaimer, the term of this patent is extended or adjusted under 35 U.S.C. 154(b) by 203 days.

(21) Appl. No.: 17/779,263

(22) PCT Filed: Nov. 20, 2020

(86) PCT No.: PCT/JP2020/043377
§ 371 (c)(1),
(2) Date: May 24, 2022

(87) PCT Pub. No.: WO2021/106780
PCT Pub. Date: Jun. 3, 2021

(65) Prior Publication Data
US 2022/0412857 A1 Dec. 29, 2022

(30) Foreign Application Priority Data
Nov. 29, 2019 (JP) .................. 2019-216087

(51) Int. Cl.
*G01N 3/42* (2006.01)
*G06T 7/00* (2017.01)

(52) U.S. Cl.
CPC ............. *G01N 3/42* (2013.01); *G06T 7/0002* (2013.01)

(58) Field of Classification Search
CPC ............... G01N 3/42; G01N 2203/008; G01N 2203/0098; G01N 2001/2873; G06T 7/0002
See application file for complete search history.

(56) References Cited

U.S. PATENT DOCUMENTS

| | | | | |
|---|---|---|---|---|
| 5,999,887 A | * | 12/1999 | Giannakopoulos | ...... G01N 3/42 702/41 |
| 6,234,873 B1 | * | 5/2001 | Yamamoto | ........ H01L 21/02008 438/692 |

(Continued)

FOREIGN PATENT DOCUMENTS

| | | |
|---|---|---|
| CN | 109870476 A | 6/2019 |
| JP | S62-245137 A | 10/1987 |

(Continued)

OTHER PUBLICATIONS

Shukla, Priyavrat et al., "Nanoindentation Studies on Shales", issued on Jun. 26, 2013, ARMA 13-578, American Rock Mechanics Association, 47th US Rock Mechanics/Geomechanics Symposium, San Francisco, CA, 10 pages.

(Continued)

*Primary Examiner* — Helen C Kwok
(74) *Attorney, Agent, or Firm* — Renner, Otto, Boisselle & Sklar, LLP

(57) ABSTRACT

To provide a three-dimensional hardness distribution measurement method with better measurement accuracy. The method is a three-dimensional hardness distribution measurement method including and repeating: cutting evenly a surface of a member to be measured; imaging the surface having been cut; and pushing an indenter for a hardness test into a plurality of points on the surface having been imaged. In the method, a cutting depth of the surface is controlled, in the cutting, to a predetermined constant amount, and inden- (Continued)

tation depths of the indenter at the plurality of points are controlled, in the pushing, to a predetermined constant amount.

9 Claims, 5 Drawing Sheets

(56) References Cited

U.S. PATENT DOCUMENTS

| | | | |
|---|---|---|---|
| 6,247,355 B1 | 6/2001 | Suresh et al. | |
| 2002/0160690 A1* | 10/2002 | Miyazawa | B24B 1/00 451/5 |
| 2003/0070475 A1 | 4/2003 | Nagashima et al. | |
| 2004/0020276 A1* | 2/2004 | Kwon | G01N 3/48 73/81 |
| 2004/0267462 A1 | 12/2004 | Berry et al. | |
| 2006/0194441 A1* | 8/2006 | Koyata | H01L 21/02019 438/692 |
| 2007/0113628 A1* | 5/2007 | Miyahara | G01N 3/42 73/81 |
| 2007/0157710 A1* | 7/2007 | Isomoto | G01N 3/42 73/81 |
| 2011/0178728 A1 | 7/2011 | Sawa | |
| 2012/0101743 A1* | 4/2012 | Sawa | G01N 3/42 702/41 |
| 2013/0061635 A1* | 3/2013 | Akiba | G01N 3/40 65/29.12 |
| 2014/0078299 A1* | 3/2014 | Kataoka | G01N 3/42 348/137 |
| 2014/0090480 A1* | 4/2014 | Adams | G01N 3/00 73/818 |
| 2014/0137733 A1* | 5/2014 | Sekiya | C23C 14/325 92/172 |
| 2016/0160700 A1* | 6/2016 | Takahashi | C22C 38/00 420/61 |
| 2016/0238132 A1* | 8/2016 | Sato | C23C 14/0641 |
| 2016/0258852 A1* | 9/2016 | Bellemare | G06F 30/23 |
| 2016/0299498 A1* | 10/2016 | Valenzuela | G02B 21/367 |
| 2016/0334315 A1* | 11/2016 | Leroux | G01N 3/42 |
| 2018/0284000 A1* | 10/2018 | Koshimizu | G01N 3/068 |
| 2018/0328171 A1* | 11/2018 | Hull | E21B 49/005 |
| 2019/0271622 A1* | 9/2019 | Hull | E21B 49/00 |
| 2020/0131464 A1* | 4/2020 | Abadie | G01N 3/40 |

FOREIGN PATENT DOCUMENTS

| | | |
|---|---|---|
| JP | H09-210893 A | 8/1997 |
| JP | 2001-221730 A | 8/2001 |
| JP | 2005-195357 A | 7/2005 |
| JP | 2007-147601 A | 6/2007 |
| JP | 2007-183190 A | 7/2007 |
| JP | 2011-145190 A | 7/2011 |
| JP | 2013-141477 A | 7/2013 |

OTHER PUBLICATIONS

Dall'Ara, E. et al., "Microindentation can discriminate between damaged and intact human bone tissue", Elsevier Inc., Bone, vol. 50, issued on Jan. 14, 2012, pp. 925-929.

Yin, Bing, MD et al., "Bone Material Properties of Human Phalanges Using Vickers Indentation", Scientific Article, Orthopaedic Surgery, vol. 11, No. 3, issued on Jun. 30, 2019, pp. 487-492.

Extended European Search Report dated Dec. 6, 2023 in corresponding EP Patent Application 20892891.1.

International Search Report corresponding to International Application No. PCT/JP2020/043377, mailed Jan. 19, 2021, including English translation.

Written Opinion of the International Searching Authority (PCT/ISA/237, WO/ISA) corresponding to International Application No. PCT/JP2020/043377, mailed Jan. 19, 2021, including English translation of section 2, citations and explanations.

Koyanagi, Yuichi et al., "Extensive three-dimensional observation of structure of steel using precision cutting and etching," 2017, pp. 651-652, including English abstract.

Fujisaki et al., "A serial sectioning observation method for three-dimensional microscopic structure and microhardness distribution measurements in bone tissue," 2018, pp. 755-756, including brief English description of relevancy (PCT/ISA/237, WO/ISA).

Fujisaki et al., "Measurements of micro hardness distribution of cortical bone tissue in high-precision serial sectioning observation," Proceedings of 2016 JSPE Spring Conference, pp. 335-336, including English abstract.

Furushiro et al., "Measurement of Micro Hardness Distribution of Steels in High-precision Consecutive Cutting and Observation.," Proceedings of 2017 JSPE Autumn Conference, pp. 79-80, including English abstract.

Office Action dated Jul. 24, 2024 in corresponding EP Patent Application 20892891.1.

* cited by examiner

THREE-DIMENSIONAL HARDNESS DISTRIBUTION MEASUREMENT METHOD AND THREE-DIMENSIONAL HARDNESS DISTRIBUTION MEASUREMENT SYSTEM

This application is a national phase of International Application No. PCT/JP2020/043377 filed Nov. 20, 2020, which claims priority to Japanese Patent Application No. 2019-216087 filed on Nov. 29, 2019 with the Japan Patent Office, which are hereby incorporated herein by reference.

TECHNICAL FIELD

The present invention relates to a three-dimensional hardness distribution measurement method and a three-dimensional hardness distribution measurement system.

BACKGROUND ART

As shown in Non Patent Literatures 1 and 2, the inventors have developed three-dimensional micro hardness distribution measurement methods. In the three-dimensional micro hardness distribution measurement methods, the surfaces of objects such as bones of living organisms or metal members are cut evenly and mirror-like, and a two-dimensional micro hardness distribution on the cut surface is repeatedly measured.

CITATION LIST

Non Patent Literature

Non Patent Literature 1
Kazuhiro Fujisaki, two others, "Measurements of micro hardness distribution of cortical bone tissue in high-precision serial sectioning observation", Proceedings of the 2016 Spring Meeting of the Japan Society for Precision Engineering, 2016, p. 335-336

Non Patent Literature 2
Naomichi Furushiro, four others, "Measurement of Micro Hardness Distribution of Steels in High-precision Consecutive Cutting and Observation", Proceedings of the 2017 Autumn Meeting of the Japan Society for Precision Engineering, 2017, p. 79-80

SUMMARY OF INVENTION

Technical Problem

As a result of various studies, the present inventors have found that when the indentation depth of an indenter is changed in a hardness measurement of a material showing the same hardness, the obtained hardness value also changes. In other words, the present inventors have found that if the indentation depth of the indenter varies, the difference in hardness measured at each location cannot be compared accurately.

Also, in a normal hardness test, when the surface of the member to be measured is mirror-polished, the hard part on the surface is polished shallowly and the soft part is polished deeply. In other words, the surface of the member to be measured has unevenness depending on the hardness. Therefore, even if the lowering amount of the indenter is made constant and the indentation depth of the indenter is controlled to be constant, the actual indentation depth of the indenter varies. Furthermore, if the parallelism of the upper and lower surfaces of the member to be measured is low, the surface inclines when the member is placed on a hardness test apparatus. Then, the surface height differs depending on the location, so that the indentation depth of the indenter is not constant and the indentation depth varies.

The present invention has been made in view of such circumstances, and provides a three-dimensional hardness distribution measurement method having a higher measurement accuracy.

Solution to Problem

A three-dimensional hardness distribution measurement method according to one aspect of the present invention includes:
  cutting evenly a surface of a member to be measured;
  imaging the surface having been cut; and
  pushing an indenter for a hardness test into a plurality of points on the surface having been imaged, the cutting, the imaging, and the pushing being repeated, in which
  a cutting depth of the surface is controlled, in the cutting, to a predetermined constant amount, and
  indentation depths of the indenter at the plurality of points are controlled, in the pushing, to a predetermined constant amount.

In the three-dimensional hardness distribution measurement method according to one aspect of the present invention, the cutting depth of the surface of the member to be measured is controlled to a predetermined constant amount in the cutting. Thereby, the surface of the member to be measured can be cut evenly so that the height relationship between the indenter attached to the hardness measurement unit and the cut surface of the member to be measured is a predetermined constant amount. Therefore, the indentation depths of the indenter at a plurality of points can be controlled to a predetermined constant amount, and the hardness can be accurately measured.

The method may be such that the cutting depth is made larger than each of the indentation depths, and the indentation depth is made larger than a depth of a process-modified layer formed on the surface in the cutting. Thereby, the hardness can be measured more accurately.

The method may further include re-imaging the surface on which an indentation is formed by the indenter, after the pushing and before the next cutting. Thereby, the hardness can be measured based on the dimensions of the indentation.

The method may be such that a structure of the surface just having been cut is imaged in the re-imaging. Alternatively, the method may be such that the surface is etched or dyed, after the cutting and before the re-imaging, and an etched or dyed structure on the surface is imaged in the re-imaging. Thereby, it is possible to know the relationship between the structure and the hardness distribution.

The method may be such that: image processing is performed to determine a difference between an image of the surface before indentation formation, acquired in the imaging, and an image of the surface after indentation formation, acquired in the re-imaging; and hardness is measured based on dimensions of the indentations in the images on which the image processing is performed. Thereby, the indentation is emphasized and the hardness based on the indentation dimension can be measured efficiently and accurately.

Alternatively, the method may be such that hardness is measured based on a maximum load value of the indenter in the pushing. Thereby, the hardness can be easily measured.

The method may be such that, in the pushing, the indenter is detected to have come into contact with the surface, and thereby the indentation depth is controlled to a constant amount.

The method may be such that, in the pushing, a speed in raising the indenter after pushing is made smaller than a speed in lowering the indenter for pushing. Alternatively, the method may be such that, in the pushing, a sampling frequency of a load value in raising the indenter after pushing is made larger than a sampling frequency of a load value in lowering the indenter for pushing. Thereby, the hardness can be measured more accurately.

A three-dimensional hardness distribution measurement system according to one aspect of the present invention includes:
- a cutting unit that cuts evenly a surface of a member to be measured;
- an observation unit that images the surface having been cut by the cutting unit;
- a hardness measurement unit that pushes an indenter for a hardness test into a plurality of points on the surface having been imaged by the observation unit; and
- a control unit that controls at least the cutting unit and the hardness measurement unit,
- cutting by the cutting unit, imaging by the observation unit, and hardness measurement by the hardness measurement unit being repeated, in which
- the control unit:
- controls a cutting depth of the surface to a predetermined constant amount, the cutting depth being made by the cutting unit; and
- controls indentation depths of the indenter at the plurality of points to a predetermined constant amount, the indentation depths being made by the hardness measurement unit.

In the three-dimensional hardness distribution measurement system according to one aspect of the present invention, the cutting unit controls the cutting depth of the surface of the member to be measured to a predetermined constant amount. Thereby, the cutting unit can cut evenly the surface of the member to be measured, so that the height relationship between the indenter attached to the hardness measurement unit and the cut surface of the member to be measured is a predetermined constant amount. Therefore, the hardness measurement unit can control the indentation depths of the indenter at a plurality of points to a predetermined constant amount, and can accurately measure the hardness.

The system may be such that the cutting depth is made larger than each of the indentation depths, and the indentation depth is made larger than a depth of a process-modified layer formed on the surface in the cutting by the cutting unit. Thereby, the hardness can be measured more accurately.

The system may be such that the control unit: performs image processing to determine a difference between an image of the surface before indentation formation and an image of the surface after indentation formation, the images being acquired by the observation unit; and measures hardness based on dimensions of the indentations in the images on which the image processing is performed. Thereby, the indentation is emphasized and the hardness based on the indentation dimension can be measured efficiently and accurately.

Alternatively, the system may be such that, hardness is measured based on a maximum load value of the indenter in the pushing. Thereby, the hardness can be easily measured.

The system may be such that, in the pushing, the indenter is detected to have come into contact with the surface, and thereby the indentation depth is controlled to a constant amount.

Advantageous Effects of Invention

According to the present invention, it is possible to provide a three-dimensional hardness distribution measurement method having more excellent measurement accuracy.

DESCRIPTION OF EMBODIMENTS

The following describes specific embodiments to which the present invention is applied in detail with reference to the drawings. However, the present invention is not limited to the following embodiments. Further, in order to clarify the description, the following description and drawings are appropriately simplified.

The following describes the embodiments of the present invention with reference to the drawings.

First Embodiment

Figure 1:
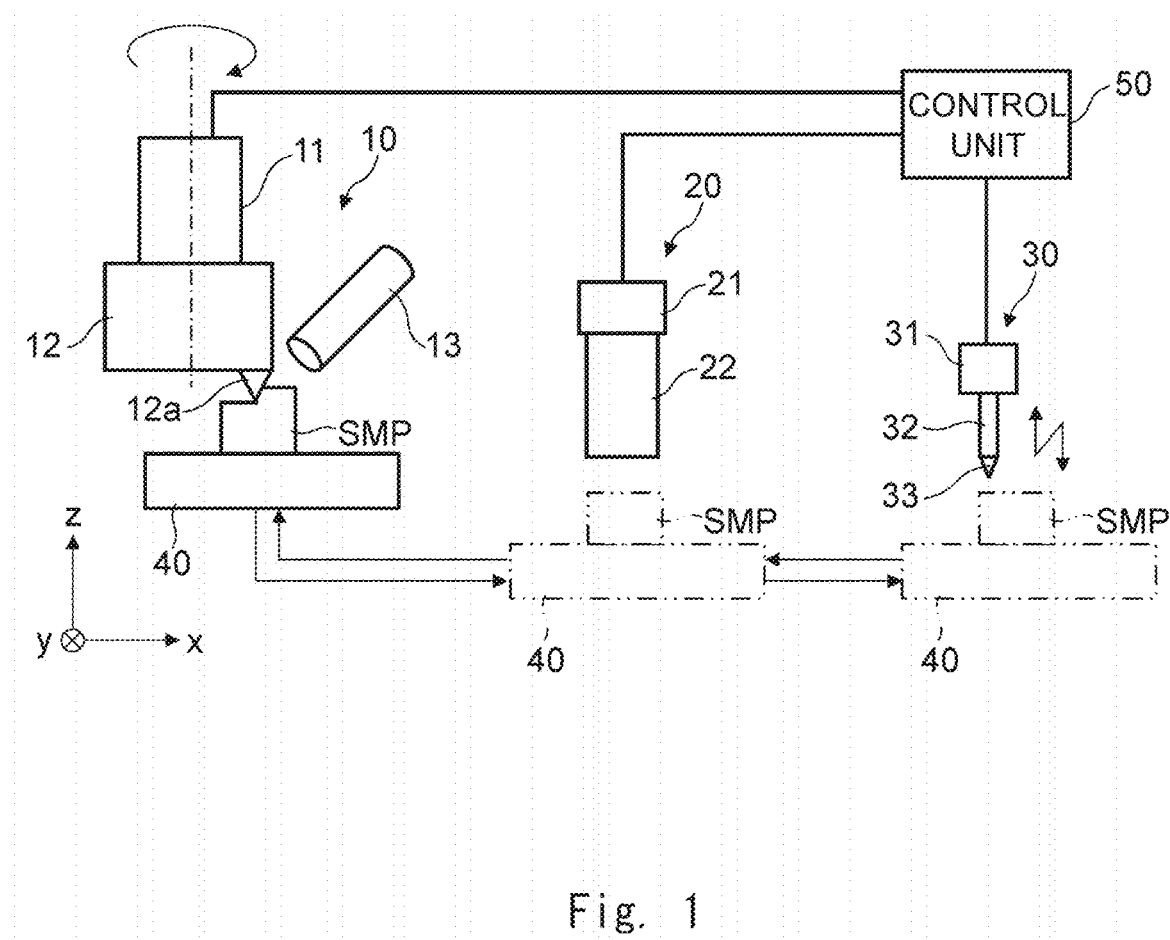
FIG. 1 is a schematic side view showing a three-dimensional hardness distribution measurement system and method according to a first embodiment.

The following describes the three-dimensional hardness distribution measurement system and method according to a first embodiment with reference to FIG. 1. FIG. 1 is a schematic side view showing a three-dimensional hardness distribution measurement system and method according to the first embodiment. Note that the following describes a micro hardness measurement. However, the three-dimensional hardness distribution measurement system and method according to the present embodiment is applicable to both macroscopic hardness measurement and hardness measurement by the nanoindentation method.

As shown in FIG. 1, the three-dimensional hardness distribution measurement system according to the present embodiment includes a precision cutting unit 10, a structure observation unit 20, a micro hardness measurement unit 30, a sample stage 40, and a control unit 50.

Note that, as a matter of course, the right-handed xyz Cartesian coordinates shown in FIG. 1 are for convenience to describe the positional relationship of the components. Normally, the z-axis positive direction is vertically upward, and the xy plane is a horizontal plane.

First, the following describes an outline of the three-dimensional hardness distribution measurement method using this system.

In the three-dimensional hardness distribution measurement method, there are repeated a step of cutting the surface of the sample SMP by the precision cutting unit 10, a step of imaging the surface by the structure observation unit 20, and a step of measuring the micro hardness at a plurality of points on the surface by the micro hardness measurement unit 30. In other words, the two-dimensional micro hardness distribution on the newly cut surface is repeatedly measured, so that the three-dimensional micro hardness distribution is measure. At the same time, this allows acquiring a relationship between the micro hardness distribution and the structure.

The following describes the respective components in more detail.

The precision cutting unit 10 cuts evenly the surface of the sample SMP fixed on the sample stage 40 based on the instruction of the control unit 50. It is preferable to cut the surface mirror-like. The precision cutting unit 10 shown in FIG. 1 is a vertical NC (Numerical Control) milling apparatus. The sample SMP, which is a member to be measured, is not limited in any way, but is, for example, a metal member, a bone of an organism, or the like.

The precision cutting unit 10 includes a drive source 11, a cutting tool 12, and an air blower 13.

The drive source 11 drives the cutting tool 12 based on the instruction of the control unit 50. The drive source 11 is, for example, a stepping motor, a servo motor, an air turbine, or the like.

The cutting tool 12 is, for example, a milling cutter, and the cutting edge 12a is fixed to the end surface on the lower side (z-axis negative direction side). The cutting edge 12a is made of, for example, diamond. The cutting tool 12 is rotated by the drive source 11, and the cutting edge 12a cuts the surface of the sample SMP. At this time, the air blower 13 blows air onto the surface of the sample SMP to remove chips and cool the cutting unit. Therefore, the surface of the sample SMP can be cut under dry conditions.

Such a configuration of the precision cutting unit 10 allows cutting the surface of the sample SMP evenly and mirror-like to an extent in which the surface can be observed with a microscope. For example, the configuration can make the maximum height roughness of the surface of the sample SMP 100 nm or less. The cutting depth on the surface of the sample SMP is a predetermined constant amount. Note that one cutting may make the target cutting depth, or a plurality of cuttings may make the target cutting depth.

As shown by an arrow in FIG. 1, after the precision cutting unit 10 cuts the surface of the sample SMP, the sample stage 40 loading the sample SMP moves under the structure observation unit 20. Cleaning may be performed to remove chips from the sample SMP on the way.

The structure observation unit 20 includes a camera (imaging machine) 21 and a microscope 22. The structure observation unit 20 images the surface of the sample SMP, magnified by the microscope 22, with the camera 21. The acquired image is stored in, for example, a storage unit (not shown) included in the control unit 50.

Note that, for example, when the sample SMP is a metal member or the like, the surface of the sample SMP, which is cut by the precision cutting unit 10, has an extremely minute step generated thereon based on the difference in the amount of elastic recovery for each crystal grain. Therefore, using, for example, a laser microscope or the like for the structure observation unit 20 allows knowing the relationship between the crystal grain boundaries and the micro hardness distribution. This extremely minute step has almost no effect on the accuracy of the micro hardness measurement. Further, the crystal grain boundaries (that is, the structure) may be emphasized by etching the surface before or after the micro hardness measurement. However, since the minute steps of each crystal grain are enlarged by etching, it is more preferable to perform etching after measuring the micro hardness. Further, instead of etching, dyeing may be performed.

As shown by an arrow in FIG. 1, after the structure observation unit 20 images the surface of the sample SMP, the sample stage 40 loading the sample SMP moves under the micro hardness measurement unit 30. The micro hardness measurement unit 30 measures the micro hardness at a plurality of points on the surface of the sample SMP. In the example of FIG. 1, the micro hardness measurement unit 30 is a Micro Vickers hardness tester, and the tester includes a load cell 31, a rod 32, and an indenter 33.

In the hardness measurement, the indenter 33 is lowered at a predetermined constant speed and pushed into the surface of the sample SMP up to a predetermined constant amount. Then, after the indenter 33 is held in a state of being pushed into the surface of the sample SMP for a predetermined constant time, the indenter 33 is raised at a predetermined constant speed.

The load cell 31 is a sensor for detecting the load when the indenter 33 is pushed into the surface of the sample SMP. Based on the load measured by the load cell 31, the micro hardness of each measurement region is obtained. The load measured by the load cell 31 is stored in, for example, a storage unit (not shown) included in the control unit 50.

Here, the hardness can be measured based on the maximum load value measured by the load cell 31. For example, as disclosed in Non Patent Literatures 1 and 2, according to the international standard ISO014577 for hardness test, using the maximum load value can determine the micro hardness (and elastic modulus) without measuring the size of the indentation.

Note that the term "hardness" in the present description includes elastic modulus.

More specifically, as disclosed in Non Patent Literatures 1 and 2, the indenter 33 is held at a constant amount of indentation depth, and then the indenter 33 is raised to separate from the sample SMP. During this period of time, the indentation depth and load value are measured. Then, based on the obtained curves (loading curve and unloading curve), the micro hardness (and elastic modulus) are determined. Specifically, the micro hardness (and elastic modulus) are determined based on the tangent line at the maximum indentation depth of the unloading curve.

Therefore, the sampling frequency of the load value measurement in raising the indenter 33 (that is, in unloading) may be controlled to be larger than the sampling frequency in lowering the indenter 33 (that is, in loading) and in holding the indenter 33. Alternatively, the raising speed of the indenter 33 (that is, the speed in unloading) may be controlled to be smaller than the lowering speed of the indenter 33 (that is, the speed in loading). Further, both controls may be combined. With such control, the micro hardness (and elastic modulus) can be measured more accurately.

Of course, the hardness may be determined by measuring the size of the indentation after unloading, as in the normal Micro Vickers hardness test.

The rod 32 is a rod-shaped member connected to the lower end of the load cell 31 and extends downward (z-axis negative direction) from the lower end of the load cell 31. An indenter 33 is fixed to the lower end of the rod 32.

The indenter 33 is, for example, an indenter made of diamond for a Micro Vickers hardness test, and has a shape of a quadrangular pyramid having a sharp lower end, for example.

Based on the instruction of the control unit 50, the entire micro hardness measurement unit 30 lowers in the z-axis negative direction, the indenter 33 at the lower end is pushed into the surface of the sample SMP, and thereby the micro hardness is measured. Further, based on the instruction of the control unit 50, the entire micro hardness measurement unit 30 moves in the horizontal direction, and repeats the measurement of the micro-hardness. Such a configuration of the micro hardness measurement unit 30 allows measuring the two-dimensional micro hardness distribution for each surface (cut surface) of the sample SMP. This allows measuring the three-dimensional micro hardness distribution.

As described above, as a result of various studies, the inventors have found that, in the micro hardness measurement, if the indentation depth of the indenter varies, the micro hardness cannot be measured accurately. Therefore, in the three-dimensional hardness distribution measurement system and method according to the present embodiment, the indentation depth of the indenter 33 is controlled to be constant.

Here, in a normal micro hardness test, when the surface of the sample SMP is mirror-polished, the hard part on the surface is polished shallowly and the soft part is polished deeply. In other words, since the surface of the sample SMP has minute unevenness depending on the hardness, even if the lowering amount of the indenter 33 is constant, the indentation depth of the indenter 33 varies.

On the other hand, in the three-dimensional hardness distribution measurement system according to the present embodiment, the surface of the sample SMP is cut evenly and mirror-like by the precision cutting unit 10. Therefore, it is not necessary to mirror-polish the surface of the sample SMP, and minute unevenness and surface inclinations due to polishing cannot occur on the surface of the sample SMP.

Therefore, controlling the lowering amount of the indenter 33 at each measurement point on the surface of the sample SMP to be constant can control the indentation depth of the indenter 33 to be constant regardless of the position of the measurement point. This can reduce the variation in the indentation depth of the indenter 33, and allows accurately measuring the micro hardness. The indentation depth of the indenter 33 is, for example, about several nm to several tens of μm, preferably about several tens of nm to several μm. Further, in determining the lowering amount, the load cell 31 may detect that the indenter 33 has come into contact with the surface of the sample SMP, to determine the lowering amount so that the indentation depth is proper. At that time, if there are holes or dents on the surface of the sample SMP, the contact position of the indenter shifts. Therefore, it is preferable to detect the contact in advance on an even place of the sample SMP to determine the lowering amount.

Further, it is preferable that the indentation depth of the indenter 33 is larger than the depth of the process-modified layer formed on the surface of the sample SMP by cutting. If the indentation depth of the indenter 33 is less than or equal to the depth of the process-modified layer, micro hardness cannot be accurately measured due to the influence of the process-modified layer. Usually, the influence of the process-modified layer makes the value of micro hardness larger than the actual value.

Note that, instead of controlling the lowering amount of the indenter 33 at each measurement point to be constant, the control may be such that, at each measurement point, the load cell 31 detects that the indenter 33 has come into contact with the surface of the sample SMP, and then the indentation depth is made constant from the detection position. For example, if there are holes or dents on the surface of the sample SMP, a constant lowering amount cannot make a constant indentation depth, so that the hardness cannot be measured accurately. However, detecting the contact at each point and making the pushing amount from there constant allows measuring the hardness more accurately even in holes and dents.

When the indenter 33 comes into contact with the surface of the sample SMP, the load is detected by the load cell 31. The load is recorded for only a predetermined time from this detection time, so that only the required amount of data is recorded. When a threshold value for the load at the start of this recording is set, it is possible to prevent a malfunction of the recording. When the threshold value is used, it is preferable to record the load before the threshold value is detected, record it retroactively if necessary, and delete it if not necessary.

As shown by an arrow in FIG. 1, after the micro hardness measurement unit 30 measures the micro hardness at a plurality of points on the surface of the sample SMP, the sample stage 40 loading the sample SMP again moves under the structure observation unit 20. Then, the structure observation unit 20 re-images the surface of the sample SMP on which the indentation is formed. The acquired image is stored in, for example, a storage unit (not shown) included in the control unit 50. Note that, in the present embodiment, this step can be omitted.

As shown by an arrow in FIG. 1, after the structure observation unit 20 re-images the surface of the sample SMP on which the indentation is formed, the sample stage 40 loading the sample SMP moves under the precision cutting unit 10. Then, the precision cutting unit 10 re-cut the surface of the sample SMP evenly and mirror-like. In order to remove the indentation of the indenter 33 and the affected part thereof, the cutting depth may be made larger than the indentation depth of the indenter 33. For example, the cutting depth of the surface of the sample SMP is about several times the indentation depth of the indenter 33. Note that one cutting may make the target cutting depth, or a plurality of cuttings may make the target cutting depth.

The sample stage 40 is a base for loading the sample SMP, and in the example of FIG. 1, the sample stage 40 can move in the x-axis direction and the y-axis direction. The three-dimensional hardness distribution measurement system, according to the present embodiment, moves the sample stage 40 while the sample SMP is fixed thereon, repeats the above series of steps, and thereby can accurately measure the three-dimensional micro hardness distribution.

Note that the system can be used as long as the precision cutting unit 10, the structure observation unit 20, the micro hardness measurement unit 30, and the sample stage 40 can relatively move in the three-dimensional direction. Therefore, the sample stage 40 may be movable only in the uniaxial direction or may be movable in the triaxial direction.

As shown in FIG. 1, the control unit 50 controls the precision cutting unit 10, the structure observation unit 20, and the micro hardness measurement unit 30.

Although not shown in FIG. 1, the control unit 50 may further control the sample stage 40. Further, the control unit 50 has a function as a computer, and includes, for example, a calculation unit such as a CPU (Central Processing Unit), storage units such as RAM (Random Access Memory) and ROM (Read Only Memory) in which various control programs and data are stored.

As described above, the three-dimensional hardness distribution measurement system according to the present embodiment controls the cutting depth of the surface of the sample SMP to a predetermined constant amount, and cuts the surface of the sample SMP evenly and mirror-like. This allows controlling the indentation depths of the indenter 33 at a plurality of points on the surface of the sample SMP to a predetermined constant amount, and accurately measuring the micro hardness.

EXAMPLES

Figure 2:
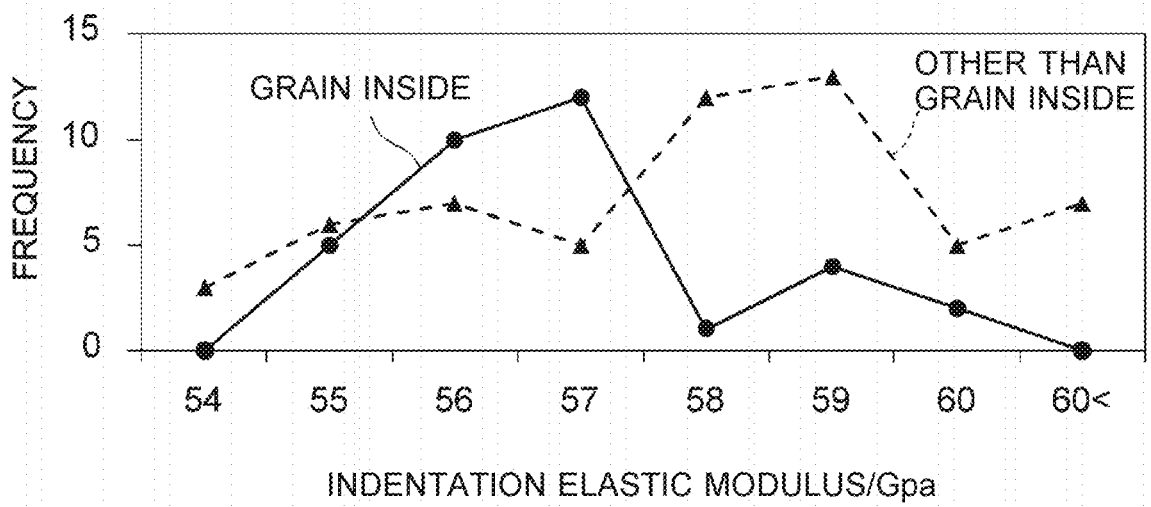
FIG. 2 is a frequency line graph of indentation elastic modulus.
Figure 3:
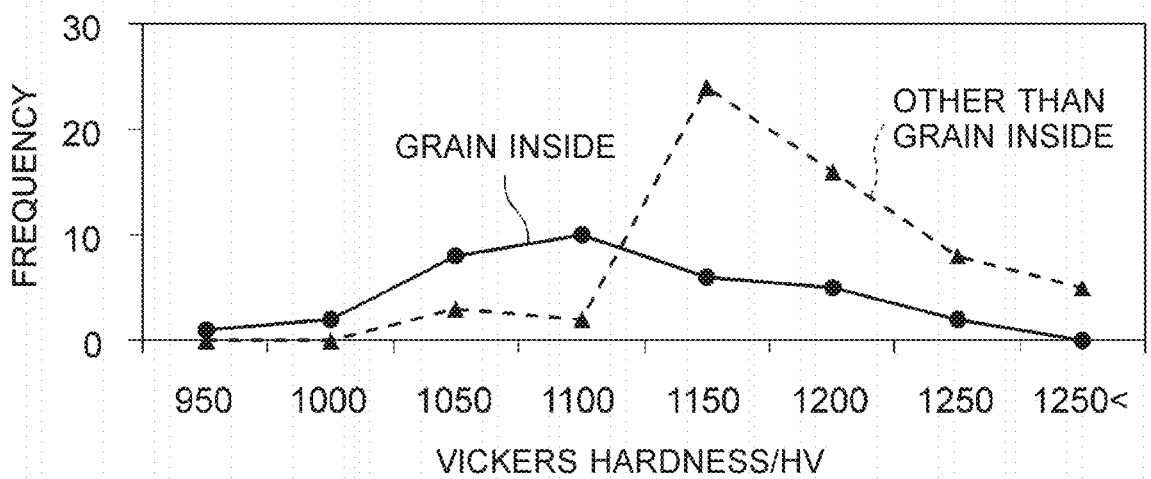
FIG. 3 is a frequency line graph of Micro Vickers hardness.
Figure 4:
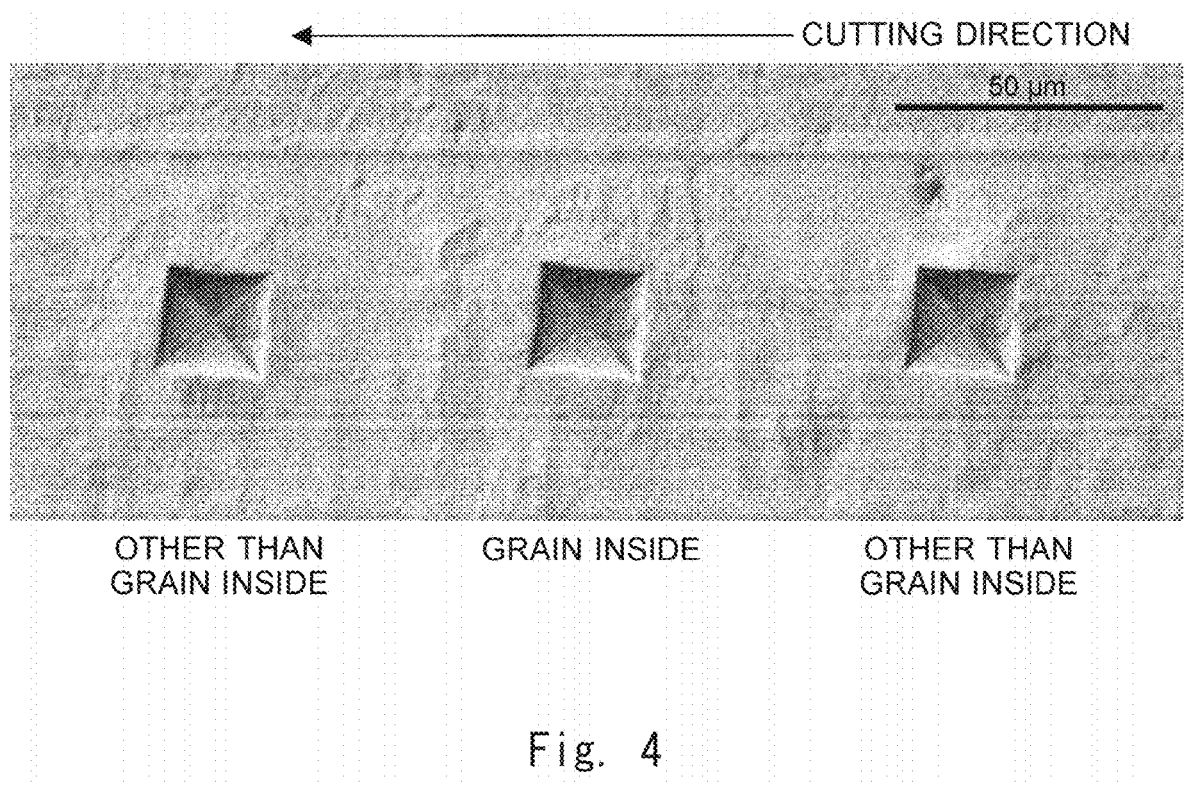
FIG. 4 is a photomicrograph of a surface on which indentations are formed.

The following describes examples of measurement using the three-dimensional hardness distribution measurement system according to the present embodiment with reference to FIGS. 2 to 4. FIG. 2 is a frequency line graph of the indentation elastic modulus. FIG. 3 is a frequency line graph of Micro Vickers hardness. FIG. 4 is a photomicrograph of the surface on which the indentation has been formed.

An ultrasonic elliptical vibration cutting apparatus was used as the precision cutting unit 10, and the surface of the nitrided stainless steel sample SMP was cut mirror-like. An indenter 33 for Micro Vickers hardness test made of diamond was pushed into this mirror-like surface at intervals of 70 μm. The indentation depth was 7 μm.

As shown in FIGS. 2 and 3, it was confirmed that both the indentation elastic modulus and the Micro Vickers hardness had a significant difference between a case in which an indenter 33 was pushed into a region inside a crystal grain (indicated as "grain inside" in the figure) and a case in which the indenter is pushed into a region other than the inside of a crystal grain including a crystal grain boundary (indicated as "other than grain inside" in the figures). Specifically, the regions other than the inside of crystal grains tended to be higher in both the elastic modulus and the Micro Vickers hardness than the regions inside the crystal grains.

FIG. 4 is a photograph of the surface just having been cut (not etched) observed with a laser microscope. Since extremely minute steps were generated for each crystal grain based on the difference in the amount of elastic recovery after cutting, the crystal grain boundaries were able to be confirmed as shown in FIG. 4. This step is, for example, about 10 to 20 nm, which is extremely smaller than 7 μm of indentation depth, so that the step does not affect the accuracy of the micro hardness measurement.

As described above, thus using the three-dimensional hardness distribution measurement system according to the present embodiment made it possible to control the indentation depths of the indenter 33 to a predetermined constant amount at a plurality of points on the surface of the sample SMP. This made it possible to accurately measure the micro hardness. In addition, it was possible to know the relationship between the structure and the micro hardness distribution.

Second Embodiment

Figure 5:
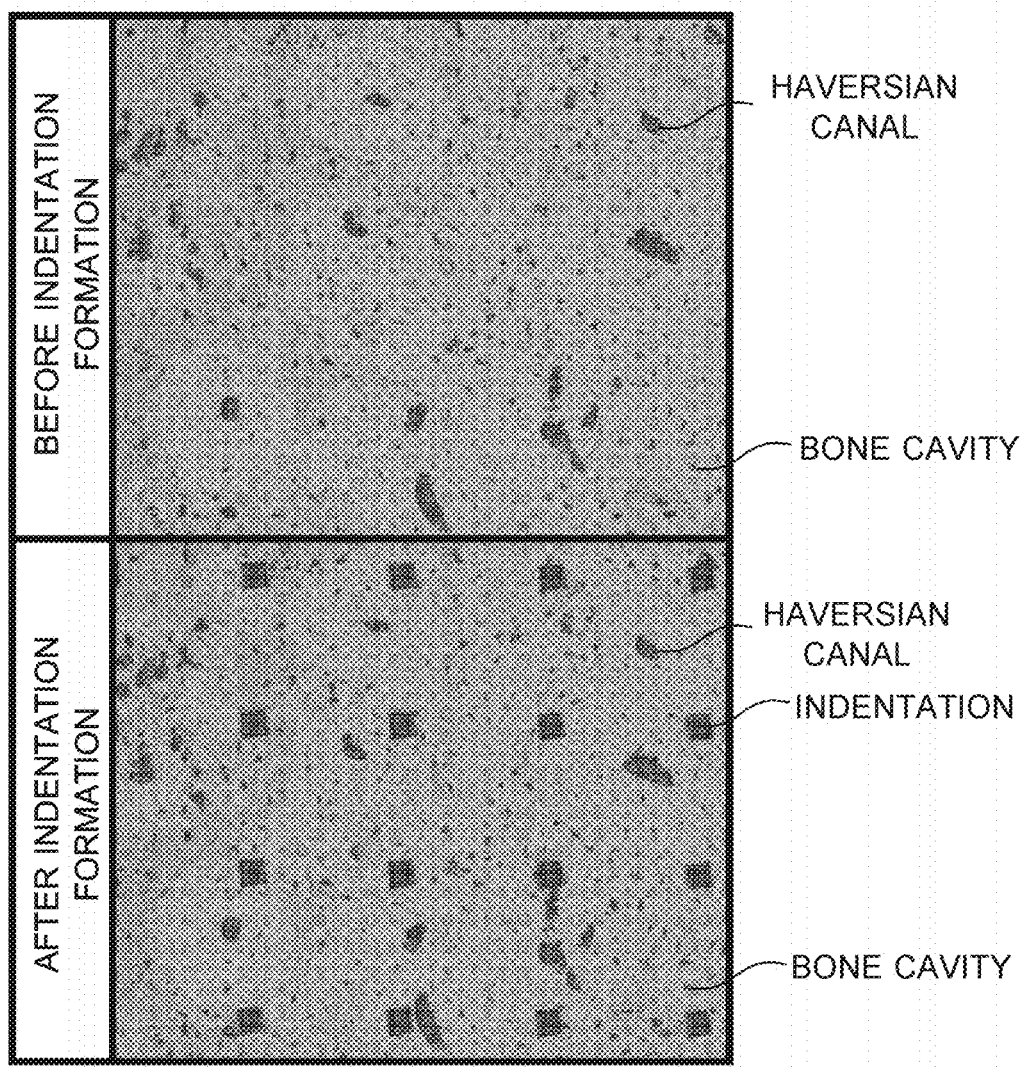
FIG. 5 is an image before indentation formation and an image after indentation formation at the same position on a surface of a sample.
Figure 6:
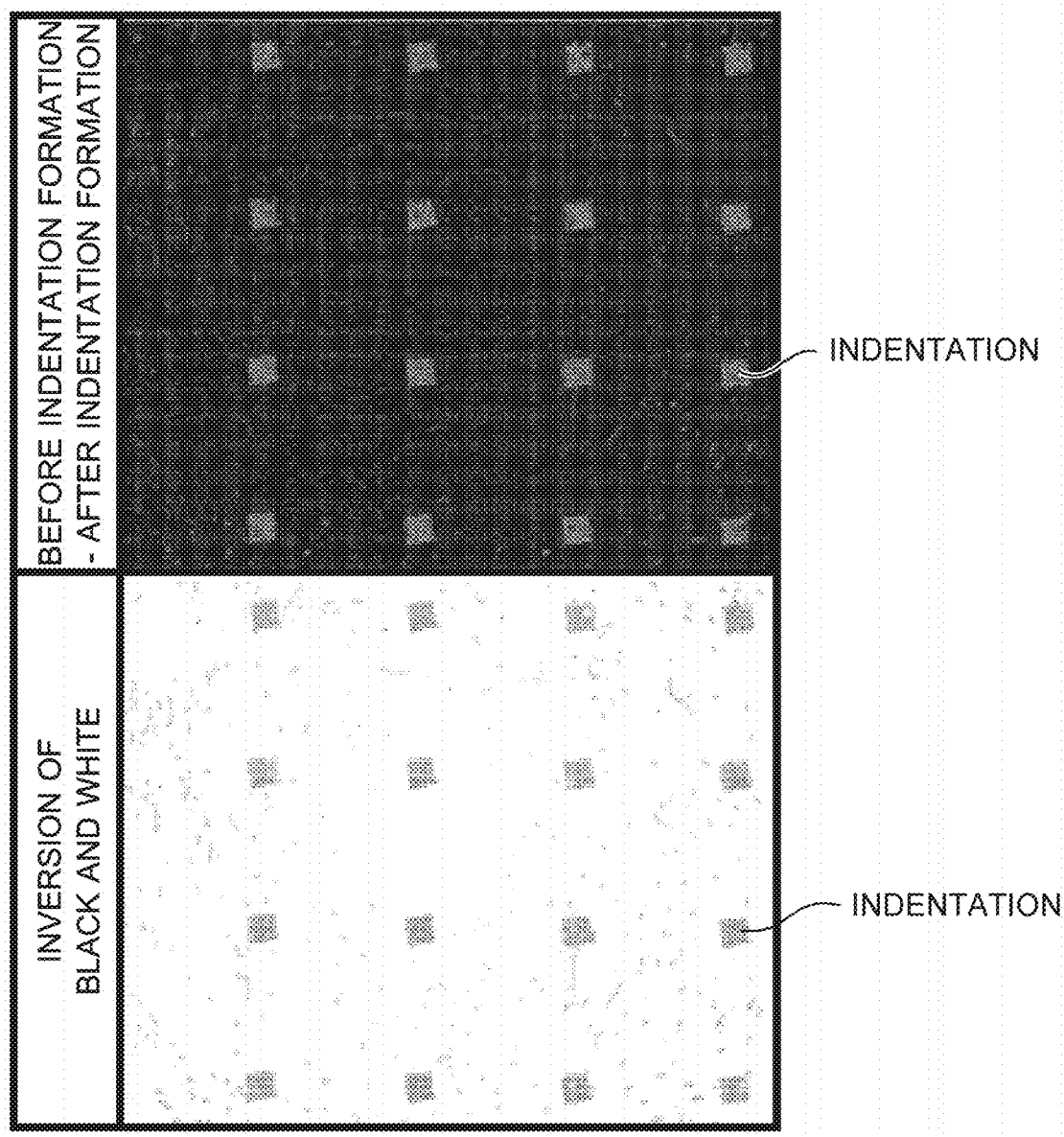
FIG. 6 is an image after image processing for determining a difference between the image after the indentation formation and the image before the indentation formation.

The next describes a three-dimensional hardness distribution measurement system and method according to a second embodiment with reference to FIGS. 5 and 6. In the present embodiment, the control unit 50 further performs image processing to determine the difference between an image after indentation formation on a surface of a sample SMP and an image before indentation formation thereon. Then, the control unit 50 determines the micro hardness based on the dimensions of the indentation in the obtained image. Therefore, the step of re-imaging the surface of the sample SMP on which the indentation is formed by the structure observation unit 20 can be omitted in the first embodiment, but is essential in the second embodiment.

FIG. 5 is the image before the indentation formation and the image after the indentation formation at the same position on the surface of the sample. The indentation pitch in FIG. 5 is 200 μm. The sample shown in the image of FIG. 5 is a diaphyseal cortical bone taken from an adult bovine femur. The observation surface is a cross section perpendicular to the bone axis direction, and as shown in FIG. 5, there can be confirmed cross sections of the Haversian canals extending in the bone axis direction and a large number of bone cavities with smaller diameters. Therefore, as shown in the lower part of FIG. 5, when a part of the indentation overlaps a Haversian canal or a bone cavity, it becomes difficult to accurately measure the indentation dimension.

Therefore, in the present embodiment, image processing is performed to determine the difference between the image after the indentation formation shown in the lower part of FIG. 5 and the image before the indentation formation shown in the upper part of FIG. 5. FIG. 6 is an image after image processing for determining the difference between the image after the indentation formation and the image before the indentation formation. Specifically, the upper part of FIG. 6 is an image obtained by removing the image after the indentation formation from the image before the indentation formation. In turn, the lower part of FIG. 6 is an image obtained by inverting black and white in the upper part of FIG. 6.

In principle, image processing, for determining the difference between the image after the indentation formation and the image before the indentation formation, generates an image containing only indentations. Therefore, as shown in FIG. 6, the indentation is emphasized and the dimension of the indentation can be measured efficiently and accurately. In other words, not only the micro hardness based on the maximum load value but also the micro hardness based on the indentation dimension can be accurately measured.

Other configurations are the same as those of the first embodiment, and the same effects can be obtained, so detailed description thereof is to be omitted.

Note that the present invention is not limited to the above embodiment, and can be appropriately modified without departing from the spirit.

This application claims priority on the basis of Japanese Patent Application No. 2019-216087 filed on Nov. 29, 2019, and incorporates all of its disclosures herein.

REFERENCE SIGNS LIST

10 PRECISION CUTTING UNIT
11 DRIVE SOURCE
12 CUTTING TOOL
12a CUTTING EDGE
13 AIR BLOWER
20 STRUCTURE OBSERVATION UNIT
21 CAMERA (IMAGING MACHINE)
22 MICROSCOPE
30 MICRO HARDNESS MEASUREMENT UNIT
31 LOAD CELL
32 ROD
33 INDENTER
40 SAMPLE STAGE

50 CONTROL UNIT
SMP SAMPLE

The invention claimed is:

1. A three-dimensional micro hardness distribution measurement method, comprising:
    cutting evenly and mirror-like a surface of a metal member to be measured by a cutting unit that evenly cuts the surface of the metal member mirror-like, the cutting forming a process-modified layer on the surface of the metal member;
    imaging the surface having been cut; and
    pushing an indenter for a hardness test into a plurality of points on the surface having been imaged, the cutting, the imaging, and the pushing being repeated,
    wherein
    a cutting depth of the surface is controlled, in the cutting, to a predetermined constant amount,
    indentation depths of the indenter at the plurality of points are controlled, in the pushing, to a predetermined constant amount, and
    the indentation depths are made larger than a depth of the process-modified layer formed on the surface in the cutting,
    wherein, in the pushing, a speed in raising the indenter after pushing is made smaller than a speed in lowering the indenter for pushing, and
    wherein, in the pushing, a sampling frequency of a load value in raising the indenter after pushing is made larger than both a sampling frequency of a load value in lowering the indenter for pushing and a sampling frequency of a load value when holding the indenter.

2. The three-dimensional micro hardness distribution measurement method according to claim 1, wherein
    the cutting depth is made larger than each of the indentation depths.

3. The three-dimensional micro hardness distribution measurement method according to claim 1, further comprising re-imaging the surface on which an indentation is formed by the indenter, after the pushing and before the next cutting.

4. The three-dimensional micro hardness distribution measurement method according to claim 3, wherein a structure of the surface just having been cut is imaged in the re-imaging.

5. The three-dimensional micro hardness distribution measurement method according to claim 3, wherein
    the surface is etched or dyed, after the pushing and before the re-imaging, and
    an etched or dyed structure on the surface is imaged in the re-imaging.

6. The three-dimensional micro hardness distribution measurement method according to claim 3, wherein
    image processing is performed to determine a difference between an image of the surface before indentation formation, acquired in the imaging, and an image of the surface after indentation formation, acquired in the re-imaging, and
    hardness is measured based on dimensions of the indentation formations in the images on which the image processing is performed.

7. The three-dimensional micro hardness distribution measurement method according to claim 1, wherein hardness is measured based on a maximum load value of the indenter in the pushing.

8. The three-dimensional micro hardness distribution measurement method according to claim 1, wherein, in the pushing, the indenter is detected to have come into contact with the surface, and thereby the indentation depths are controlled to a constant amount.

9. A three-dimensional micro hardness distribution measurement method, comprising:
    cutting evenly and mirror-like a surface of a metal member to be measured by a cutting unit that evenly cuts the surface of the metal member mirror-like, the cutting forming a process-modified layer on the surface of the metal member;
    imaging the surface having been cut; and
    pushing an indenter for a hardness test into a plurality of points on the surface having been imaged, the cutting, the imaging, and the pushing being repeated,
    wherein
    a cutting depth of the surface is controlled, in the cutting, to a predetermined constant amount,
    indentation depths of the indenter at the plurality of points are controlled, in the pushing, to a predetermined constant amount, and
    the indentation depths are made larger than a depth of the process-modified layer formed on the surface in the cutting,
    wherein, in the pushing, a sampling frequency of a load value in raising the indenter after pushing is made larger than a sampling frequency of a load value in lowering the indenter for pushing, and
    wherein, in the pushing, a sampling frequency of a load value in raising the indenter after pushing is made larger than both a sampling frequency of a load value in lowering the indenter for pushing and a sampling frequency of a load value when holding the indenter.

* * * * *